July 15, 1958  F. A. QUIROZ  2,842,970
LIQUID LEVEL CONTROL
Original Filed Dec. 9, 1949  2 Sheets-Sheet 2

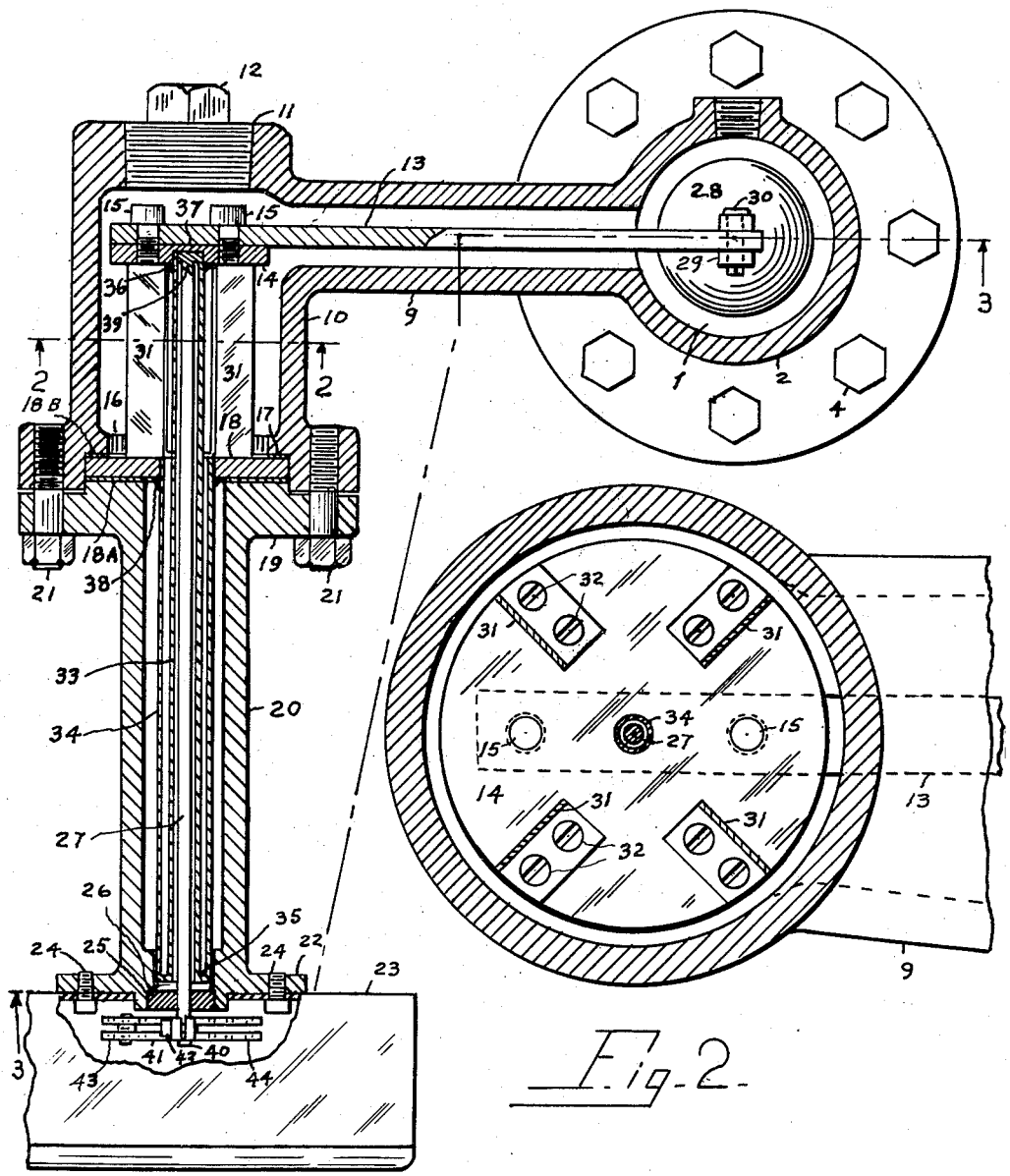

INVENTOR.
Francisco Angel Quiroz

United States Patent Office 2,842,970
Patented July 15, 1958

2,842,970

LIQUID LEVEL CONTROL

Francisco Angel Quiroz, Newark, N. J.

Substituted for abandoned application Serial No. 131,442, December 9, 1949. This application April 29, 1957, Serial No. 663,860

6 Claims. (Cl. 74—18.1)

This invention consists in new and useful improvements in automatic liquid level controllers, and more particularly in the kind of controllers wherein a float or a fluid displacing member of predetermined weight actuates a torsion mechanism whereby a movement is transmitted to operate a suitable pilot valve outside of the liquid chamber.

Another object of this invention is to simplify the torsion mechanism in such manner that all bearings usually needed inside the apparatus are eliminated, thereby diminishing friction and the danger of jambing, and a more dependable and accurate instrument is obtained.

A further object of this invention is to remove from the torsion tube the measuring spring torque supporting the displacement member which tube is sometimes subjected to very high pressures, and is liable to collapse. The measuring spring torque is the amount of flexing that a spring member is forced to do by an outside force. The flexing is in direct proportion to the force. The principle is used in spring scales. In this case the variations in weight of the float caused by changes in the amount of displacement of the float produce the flexing of the springs which control the movement of the operating rod. In my invention the torsion tube does not carry the weight of the float, does not have to be of thin, resilient material requiring a supporting bearing, and it can be constructed smaller in diameter to withstand a greater pressure. In my device, the greater part of the torque is absorbed by flat springs conveniently arranged to provide at the same time a proper mounting for the float lever and torsion members, and eliminates the necessity for bearings or supports.

A still further object of this invention, is to provide a more compact and shorter torsion tube, which is provided by folding the torsion tube.

Other and further objects of this invention will be obvious or pointed out hereinafter, or will be indicated in the appended claims. It is to be understood, however, that the embodiments of this invention herein shown and described are for the purpose of illustration only, and are not to be given an interpretation in a limiting sense. This application is a substitute for part of the application No. 131,442. Filed December 6, 1949 and covers only the level control mechanism without the pilot instrument which will be covered in another application.

Referring now to the drawings in which similar reference characters refer to similar parts throughout the several views:

Fig. 1 is a transverse sectional view of the apparatus taken through line 1—1 in Fig. 3, showing the torsion mechanism and pilot valve casing broken away to show the relative position of the pilot operating cross bar.

Fig. 2 is an enlarged vertical sectional view along line 2—2 in Fig. 1, showing the arrangement of the torque flat springs, torsion tube and operating rod.

Figure 3:
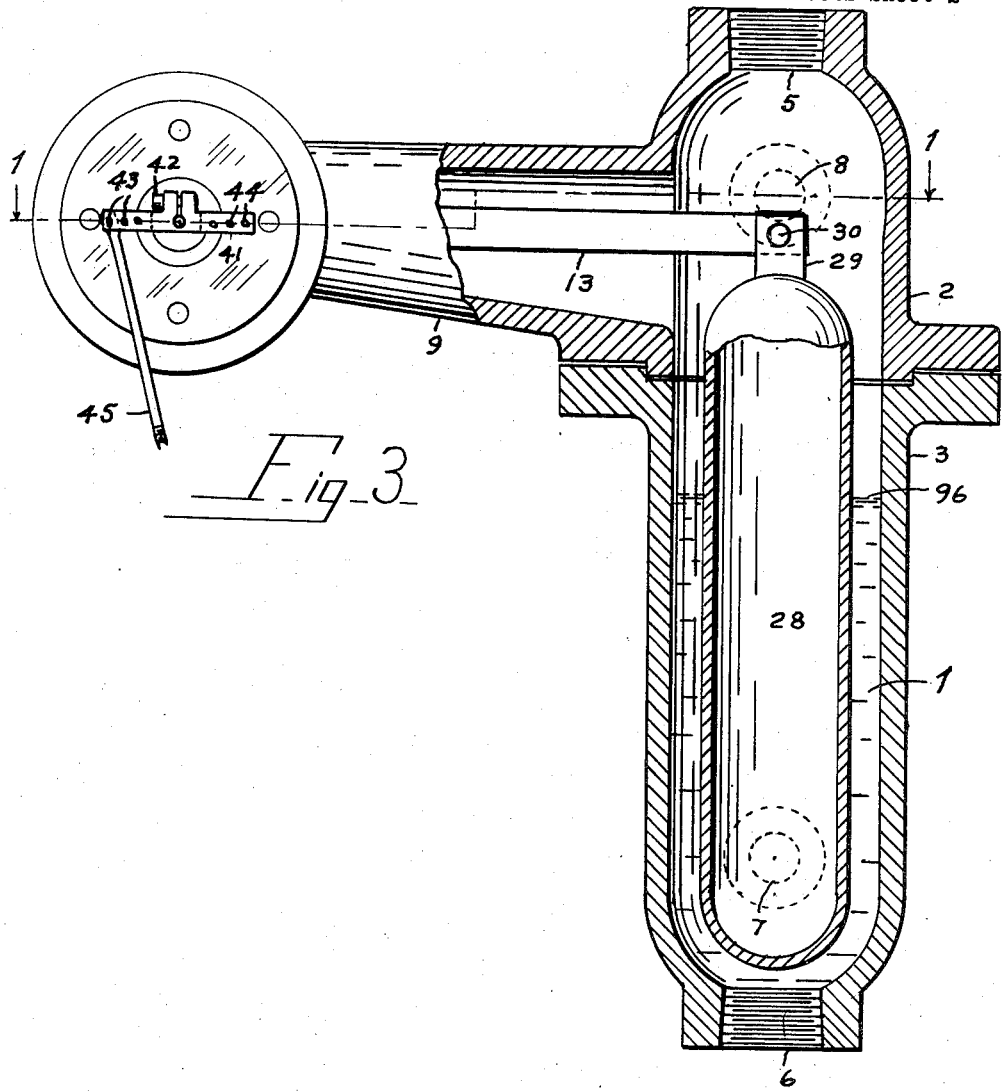
Fig. 3 is a vertical view partly in section and partly in elevation, along the line 3—3 in Fig. 1, and also showing a semidiagrammatic arrangement and connections of the parts comprising the operating pilot.

Referring now to the drawings in more detail, a float chamber 1, preferably made in two parts 2 and 3, assembled together by means of bolts 4, is provided with threaded equalizing ports 5 and 6, which are used to connect the float chamber to the liquid vessel, not shown. The float chamber may also be provided with two more threaded ports 7 and 8, which can be used to install a glass tube level indicator or for mounting means. The upper part of the float chamber is provided with a horizontal integral float arm housing 9, and a horizontal head chamber 10 at right angles to the float arm housing, said head chamber having a threaded opening 11, and a removable plug 12 to facilitate the mounting of the float lever 13 on the torsion assembly spring disc 14, by means of the screws 15. At the opposite side and concentric with the opening 11, the head chamber 10 is provided with a flanged opening 16 having a circular seat 17 adapted to accommodate the torsion assembly supporting disc 18 which is held in position between gaskets 18-A and 18-B by the flange 19 of the torsion tube housing 20, by means of the screws 21. The housing 20 is also provided at the other end with a smaller flange 22 adapted to support the pilot housing 23, by means of the screws 24, and also to provide a seat 25 to accommodate a graphite bearing 26 which supports the outside end of the operating rod 27.

The operating mechanism consists of the displacement float 28, which is provided with a fork connection 29 and is suspended by means of the pin 30, from the end of the float lever 13, to move freely in a vertical position, in relation to the amount of liquid displacement in the float chamber 1; said displacement float is preferably made heavier than the specific gravity of the liquid, in order to keep it in a perfect vertical position, and also to withstand high external pressure. A float lighter than the specific gravity of the liquid would have to be made of thin material and would collapse under high pressure, it would reverse the torque force, instead of pulling down it would push up and tend to rub against the walls of the housing and cause friction. That is the reason why it is preferable to use a float of heavy specific gravity greater than the liquid that will sink in it, and use as operating force the weight of said float minus the amount of displacement which said float makes in the liquid and which varies in relation to the position of the level line of the liquid. The other end of the float lever 13 is firmly secured to the spring disc 14, which is preferably circular, by means of the screws 15. The disc 14 is part of the torsion mechanism, which, besides said disc, comprises the supporting disc 18, the flat springs 31 which are provided with right angle bent ends and adapted to tie the two discs together by anchoring one end of the springs to the disc 14 and the other end to the supporting disc 18, preferably by means of the screws 32. The springs 31 are preferably four in number, and equally spaced, and disposed in a radial position relative to the common axis of the discs 14 and 18; this is desirable in order to support the disc 14 firmly, and prevent any radial or axial movement of said disc, but to allow a certain amount of rotary movement concentric with its axis, which is caused by the change in the static weight of the float 28. The total rotary movement will be about 6 degrees of uniform movement, directly proportional to the amount of displacement of the float 28. The function of the flat springs is the most important feature of this invention, they provide a spring arrangement which is flexible to a torsional movement, but inflexible to a radial or axial movement and provides mounting means for an oscillating disc or a part of any convenient form, and allows it to oscillate with a rotary movement without the support of any live bearing which always produces friction and is liable to stick and affect the efficiency of the device and cause trouble. (A live bearing is one in which the supported part moves in relation to the supporting part at the point of contact.) In a spring supported part, there is no movement between the parts, they move together with no friction. The elimination of this friction is the main object of this invention. The springs 31 are preferably made flat, because the wider they are in relation to the thickness, the more they are able to bend towards the flat sides and the more they will resist bending towards the thin sides. Round or square spring bars will bend in all directions and the oscillating movement of the disc will not be concentric to the axis of the operating rod and the function of said rod will be defective.

It is clear that the disc 14 can only move concentrically to its axis, because of the fact that the flat springs can only bend tangentially in relation to the disc 14, if they were free at that end; but as they are 90 degrees apart and are tied to the disc, they move in an arc. The combined bending of the springs 31 which are firmly secured to the spring disc 14 and to the supporting disc 18, allows the disc 14 to move only concentrically in relation to the axis of the supporting disc 18 which is firmly anchored and held in position in the head chamber 10 by means of the flange 19 of the torsion tube housing 20. Therefore it is clear that the disc 14 does not require any other kind of bearing or support to withstand the weight of the arm 13 and the float 28. The length as well as the thickness and width of the springs 31 determine the amount of movement that the disc 14 will have and will be imparted to the operating rod 27 by the torque of the float 28.

The torsion tube I prefer to use in this invention is what I call a compound tube, which consists of two sections, 33 and 34, welded together at 35, the section 33 being of smaller diameter than the section 34, so that it will operate inside of the section 34. It is clear that with this arrangement, I obtain an amount of torsion per pound of torque equal to the sum of the torsion in both sections of the tube. In other words I have a folded torsion tube that requires less space, and provides a more compact unit. It is clear that the compound tube could have more than two sections, by folding the tube back and forth, each section being of larger diameter than the previous one. In this way a greater degree of torsion is obtained without increasing the length of the assembly. In the drawings I show a compound torsion tube of only two sections 33 and 34. The upper end of the inner section 33 is welded and firmly secured in the seat 37 of the spring disc 14 and the upper end of the section 34 is inserted in the center hole 38 of disc 18 and welded therein. If it is desired to use a single section torsion tube, the outer end is to be welded to the casing 20, to close the casing at that end. It can be seen that in this invention the only function of the torsion tube is to serve as a frictionless stuffing box between the operating rod 27 and the disc 18 sealing the passage of any liquid or gas contained in the float housing. Said tube supports nothing and requires no measuring spring torque. It can be made of any convenient material.

The upper end of the operating rod 27 is also welded firmly into the seat 37 of the spring disc 14, and the lower end 40 of the rod 27 is supported by the graphite bearing 26, and allowed to rotate partially in said bearing, as much as the partial rotation given to the spring disc 14 by the float arm 13, which is actuated by the difference in displacement of the float 28. The lower end 40 of the rod 27 is provided with a cross bar 41 which is clamped in position by the screw 42. The cross bar 41 is provided with a number of holes 43 on one arm and a number of holes 44 on the other arm, which are used for altering the position of the connecting link rod 45 which is adapted to operate pilot mechanism not shown.

The operation of the apparatus is as follows:

Any variation of the liquid level being controlled in a chamber to which the apparatus is connected by means of the equalizing ports 5 and 6, is transmitted to the float casing 1 and will cause the rising or falling of the liquid level 96, and will affect the displacement and effective weight of the float 28.

Therefore the amount of torque exerted by means of the lever 13 on the spring disc 14, which is suspended by the flat springs 31, will change in relation to the amount of displacement of the float 28, and the disc 14 will tend to rotate in proportion to the change in the torque, and will give a torsion movement to the compound torsion tube 33 and 34, and at the same time will give a rotating movement to the operating rod 27, until the reaction of the exerted torque, the weight of the float and the displaced liquid are in balance. Any rotary movement of the rod 27 will give an equal movement to the cross bar 41. In Fig. 3 I show the link rod 45 connected to one of the holes 43 of the cross bar 41. Said link rod provides the means to operate a pilot or a controlling instrument.

What is claimed is:

1. In a device for transmitting motion of a moving element within the housing to a movable element exterior to the housing, the motion transmitting means comprising a supporting disk having a center hole, a plurality of substantially flat spring bars, each with one end secured to one face of the supporting disk around the center hole, substantially in a perpendicular position in relation to said face and having the flat sides substantially in radial position in relation to the axis of said supporting disk, a second disk substantially parallel to the supporting disk firmly secured to the opposite ends of said spring bars, a rod with one end secured to the center of the second disk and extending between said spring bars along the axis of both disks and beyond the center hole of the supporting disk, flexible sealing means covering said rod between said disks, said sealing means being secured to the second disk and to the supporting disk around the center hole of the latter and spaced from said rod, means for securing said supporting disk within the housing in a place with an opening that will allow said rod to extend to the exterior of said housing, connecting means between the moving element within the housing and the second disk mounted on the spring bars, and connecting means between the portion of the rod extending out of the housing and the movable element in the exterior of the housing.

2. In a device for transmitting motion of a moving element within a housing to a movable element exterior to the housing, the motion transmitting means including a plurality of spring bars, mounting means to secure one end of said spring bars within the housing and to allow said spring bars to project inward in substantially a horizontal position, a disc mounted on the projecting ends of said spring bars substantially with its planes at right angle to the projecting spring bars and adapted to twist said spring bars in proportion to the force received from the moving element within the housing, a rod secured to said disk projecting to the exterior of the housing and adapted to transmit the twisting motion of said disk to a movable element in the exterior of the housing, and frictionless sealing means between said rod and the housing.

3. In a device for transmitting motion from a moving element within a housing to a movable element exterior to the housing, the motion transmitting means, including a number of spring bars, means for securing one end of each spring bar to the housing, means for binding the opposite end of each spring bar to one another, a flexible tube having one end closed and one end open, means for securing the closed end of said tube to the binding means of said spring bars, means for securing the open end of said tube to the housing in a position to allow free passage from the open end of said tube to the exterior of the housing, a rod of smaller diameter than the interior of said tube, having one end firmly secured to the inside of the closed end of said tube and projecting concentrically through the open end of said tube to the exterior of the housing, means for giving a torsional motion to the binding means of said spring bars by the moving element within the housing, and means for transmitting motion from the portion of said rod extending out of the housing to the movable element exterior to the housing.

4. In a device of the character described and claimed in claim 1, wherein the flexible sealing means covering the rod, consist of a flexible tube closed at one end and open at the other end and is secured to the second disk at the closed end and the open end extends beyond the opening of the supporting disk, a second tube of larger diameter than the preceding tube having one end secured around the center hole of the supporting disk and the other end welded around the open end of said preceding tube.

5. In a device of the character described and claimed in claim 1, wherein the spring bars are adapted and disposed to bend in an arc corresponding to the twisting motion of the second disk.

6. In a device of the character described and claimed in claim 1, wherein the means for securing said supporting disk within the housing consists of a flanged opening in the housing having a circular seat adapted to accommodate the supporting disk, a flanged member adapted to clamp and hold said supporting disk in the circular seat of the housing and having means for supporting the movable element exterior to the housing.

References Cited in the file of this patent
UNITED STATES PATENTS

| | | |
|---|---|---|
| 1,173,038 | Roschanek | Feb. 22, 1916 |
| 1,827,560 | Binckley | Oct. 13, 1931 |
| 2,353,641 | Brockett | July 18, 1944 |
| 2,698,544 | Hanssen | Jan. 4, 1955 |